(12) United States Patent
Burdock

(10) Patent No.: US 11,953,296 B1
(45) Date of Patent: Apr. 9, 2024

(54) MATERIAL CREATED FROM INTERLOCKING PARTS

(71) Applicant: John Burdock, Quakertown, PA (US)

(72) Inventor: John Burdock, Quakertown, PA (US)

( * ) Notice: Subject to any disclaimer, the term of this patent is extended or adjusted under 35 U.S.C. 154(b) by 0 days.

(21) Appl. No.: 18/244,578

(22) Filed: Sep. 11, 2023

(51) Int. Cl.
*F41H 5/007* (2006.01)
*B33Y 80/00* (2015.01)
*F41H 5/04* (2006.01)

(52) U.S. Cl.
CPC .............. *F41H 5/007* (2013.01); *B33Y 80/00* (2014.12); *F41H 5/0471* (2013.01)

(58) Field of Classification Search
None
See application file for complete search history.

(56) References Cited

U.S. PATENT DOCUMENTS

| 700,635 | A | * | 5/1902 | Finche | ............... B62D 33/0207 296/36 |
| 11,077,655 | B2 | | 8/2021 | Polit Casillas et al. | |
| 2018/0345651 | A1 | * | 12/2018 | Polit Casillas | ......... B32B 5/024 |

* cited by examiner

*Primary Examiner* — Jeffrey D Washville
(74) *Attorney, Agent, or Firm* — IP Works Law, PLLC

(57) ABSTRACT

A material created from interlocking parts is shown and described. Each interlocking includes a first side connected to a main beam at one end and a second side connected to the opposing end of the main beam. The interlocking part includes plurality of loops connected at least to the main beam. The interlocking part is configured to be secured to at least one additional interlocking part via the loops.

9 Claims, 8 Drawing Sheets

MATERIAL CREATED FROM INTERLOCKING PARTS

BACKGROUND OF THE INVENTION

The present invention relates to materials which have the ability to be flex in one direction and become rigid in another. More particularly, the present invention provides a material which when properly created is flexible in a first direction but remains rigid in an opposite second direction.

There are many different products on the market today which make use of 3D printing. However, many of these products either have no flexibility, or, in the opposite extreme are completely flexible. There are no products on the market which are partially flexible. The present material may be printed from a 3D printer or other means. Further, the material has the ability to be folded and bend in one direction while becoming rigid when pressed in an opposite second direction. In one embodiment the material may slightly flex when pressed in the second direction, however, this flex is limited and will serve to tighten the material together.

The ability for a product to partially flex has many advantages and can provide many benefits over currently available technologies. One use for such a material is various types of armor. Currently there is very little on available in the way of lightweight and flexible armor that still offers adequate protection. Light and flexible armor exists but it does not stop many common types of projectiles. Further, most armor is not stab resistant.

The present material has potential to address both of the issues current armor leaves. First, the material may be incorporated into armor as a single unit. Typically, light weight body armor is created from layers of Kevlar. However, this material without additional material, usually in the form of heavy metal plates, only has a limited amount of stopping power. By adding this material to the armor, it is possible that one can create an armor that is capable of stopping additional type of projectiles.

Another use for this material includes adding this material behind existing armor. Typically, items used in such a manner are referred to as trauma pads. The usual purpose of these pads is to limit the amount of bodily trauma absorbed when a metal plate is hit with a projectile. These devices do not add to the resistance of such plates. By using this material additional resistance can be added to existing plates creating a more robust armor.

An issue exists with typical light armor in that it does not prevent slashing or stabbing. The nature of this material is such that it can be used to prevent stabbing or slashing. Since the present material is flexible in one direction it can be worn on a user's arms, legs, or torso. This will allow a user to cover more area of their bodies while still being able to move around freely.

Another potential use for such a material is electronic screens. Currently, phone screens are being designed to be larger and require rigid support along their backing. Removing their ability to flex. Some screens are able to be folded but still require a rigid backing, with only a single direction of rotation along a hinge. Currently, no technology exists that allows for an electronic screen to flex while at the same time maintaining rigidity. The present material can be used to fill these gaps in electronic technology.

Consequently, there is a need for an improvement in the art of materials, especially materials that are used for amours. The present invention substantially diverges in design elements from the known art while at the same time solving a problem many people face when looking for an improved lightweight and rigid material. In this regard the present invention substantially fulfills these needs.

SUMMARY OF THE INVENTION

The present invention provides a material created from interlocked parts wherein the same can be utilized for providing convenience for the user when in need of a lightweight and strong material. The material created from interlocking parts includes a plurality of interlocking parts. Each interlocking part includes a first side connected to a main beam at one end and a second side connected to the opposing end of the main beam. A plurality of loops connected at least to the main beam. Each interlocking part is configured to be secured to at least one additional interlocking part via the loops.

Another object of the material created from interlocking is to have the first side have a smaller surface area than the second side.

Another object of the material created from interlocking is to have the loops be connected at least in part to the underside surface of the first side and the underside surface of the second side.

Another object of the material created from interlocking is to have the loops positioned at an angle compared to the main beam.

Another object of the material created from interlocking is to have the angle is between 0 degrees and 45 degrees.

Another object of the material created from interlocking is to have the first side, the second side, and the main beam are all hexagonal.

Another object of the material created from interlocking is that the material bends in a first direction and remains rigid in a second opposite direction.

Another object of the material created from interlocking is that the material allows for a slight flex when a force is applied to force the material in the second direction.

Another object of the material created from interlocking is to have a first gap exist between each apposing edge of the first side of each interlocking part and a second gap exists between each apposing edge of the second side of each interlocking part.

Another object of the material created from interlocking is to have the size of the second gap directly relate to the rigidity of the material. The relationship is such that the smaller the gap the more rigid the material and the larger the gap the greater the flex of the material before becoming rigid.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
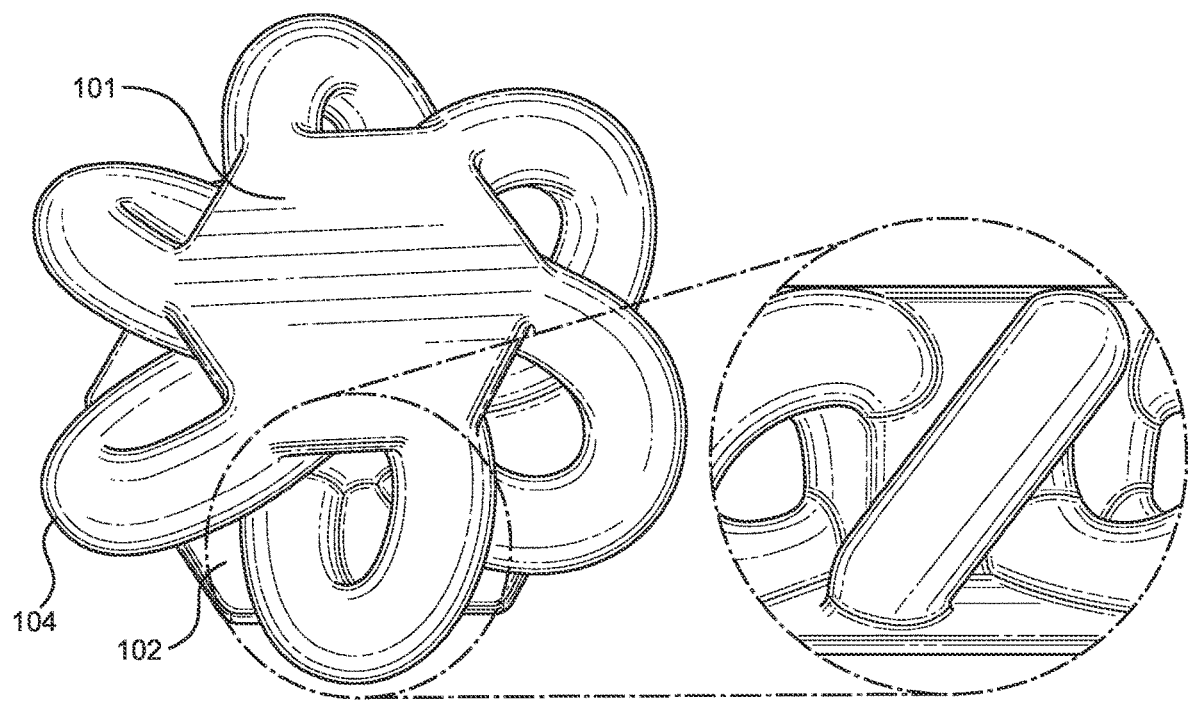
FIG. 1 shows a perspective view of one embodiment of a single interlockable part of the material made from a plurality of interlocking parts.

With regard to the reference numerals used, the following numbering is used throughout the drawings.

| | |
|---|---|
| 101 | First side |
| 101a | Edge of the First side |
| 102 | Second side |
| 102a | Edge of the second side |
| 103 | main beam |
| 104 | loops |
| 700 | Sheet of material |
| 700a | First side of the sheet of material |
| 70b | Second side of the sheet of material |
| 701 | Interlocking part |
| 702 | Gaps |
| 7011 | Interlocking part |
| 7012 | Interlocking part |
| 7013 | Interlocking part |
| 7014 | Interlocking part |
| 7015 | Interlocking part |
| 7016 | Interlocking part |
| 901 | Force |
| 902 | Point |
| 1000 | Body armor |
| 1001 | First material |
| 1002 | Kevlar |
| 1003 | Body |
| 1101 | Armor |
| 1101a | Shirt |
| 1101b | Pants |
| 1102 | Wearer |

DETAILED DESCRIPTION OF THE INVENTION

Reference is made herein to the attached drawings. Like reference numerals are used throughout the drawings to depict like or similar elements of the material created from interlocked parts. For the purpose of presenting a brief and clear description of the present invention, a preferred embodiment will be discussed as used for the material created from interlocked parts. The figures are intended for representative purposes only and should not be considered to be limiting in any respect.

There are many embodiments which the interlockable parts may take. Here will be described several embodiments of these parts. It shall be known that one of ordinary skill in the art will appreciate that making modifications to the embodiments as described will not so depart from the present invention as not to be covered by this disclosure. Each and every interlockable part which, when connected with other interlockable parts, shall be foldable in one direction and rigid in another direction.

Under a dictionary definition rigid means unable to bend or be forced out of shape. For purposes of this disclosure the material is described as rigid in one direction, this use of rigid does not preclude the material from having a slight flex as described herein. Furthermore, the use of the term flex is not meant to be defined as moving a tremendous amount or significantly changing shape. Here the ability to flex shall be defined as having a slight bend without losing shape.

The present material will further be described as having the ability to fold or collapse in another direction. This shall mean having the ability to form a shape or bending over itself.

Figure 2:
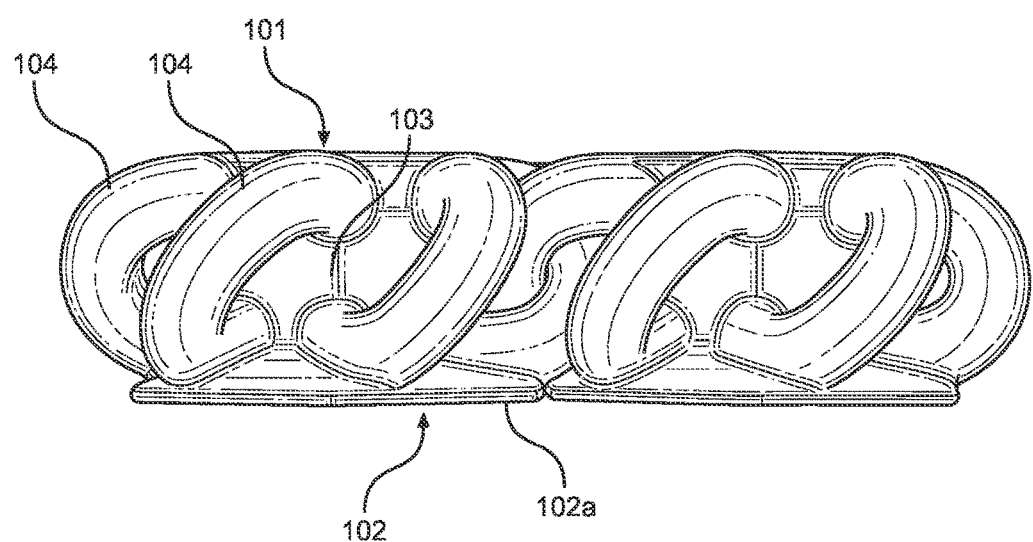
FIG. 2 shows a side view of one embodiment of the material made from a plurality of interlocking parts.

Referring now to FIG. 1 and FIG. 2, there is shown a perspective view and a side view of one embodiment of interlockable parts of the material made from a plurality of interlocking parts. The material made from interlocking parts may be made in any number of different ways. However, one viable manner to make the material includes use of a 3D printer. One of ordinary skill in the art will understand that there are many ways to create such a material and that the use of a 3D printer is only meant to function as an example and a benefit of the material described.

In a first embodiment the interlockable part includes a first side 101. In the shown embodiment the first side 101 is a hexagonal shape. In other embodiments the first side 101 is an octagon or other suitable shape. Other suitable shapes may include numerous shapes so long as the shapes allow the interlocking part to bend or fold when secured to at least one other interlocking part. In one embodiment the first side 101 has a smaller surface area than that of a second side 102, described below. This will allow for the interlocking devices to bend and fold when connected into a sheet of material.

Opposite the first side 101 is the second side 102. In the shown embodiment the second side 102 is a hexagonal shape. In other embodiments the second side 102 is an octagon or other suitable shape. A suitable shape is one which has the ability to have an edge 102a of the second side 102 sit flush against an edge of a first side of at least one other connectable part.

The first side 101 and the second side 102 are held together with a center beam 103. In the shown embodiment the center beam 103 is also of hexagonal shape. However, this should in no way be limiting and many different shapes may be used which will allow for functionality to be maintained.

A plurality of loops 104 are secured to various locations including the center beam 103. In many embodiments the loops 104 are connected at angles. In one embodiment the angles are between 0 and 45 degrees. The loops 104 are designed such that they are able to secure at least one loop of at least one other connectable part. The connection of the loops 104 will allow the connectable parts to bend, fold, flex and remain rigid depending on the direction of force applied to the material which is created by connecting a plurality of interlockable parts.

In the shown embodiment the loops 104 are circular or C shaped. Loops 104 of this shape will allow for a greater flexibility of the material when secured together. This is do the space allowed between the loops 104 due to the C shape of the loops 104. The greater the amount of space allowed the more space which must be taken up before the material becomes rigid.

Figure 3:
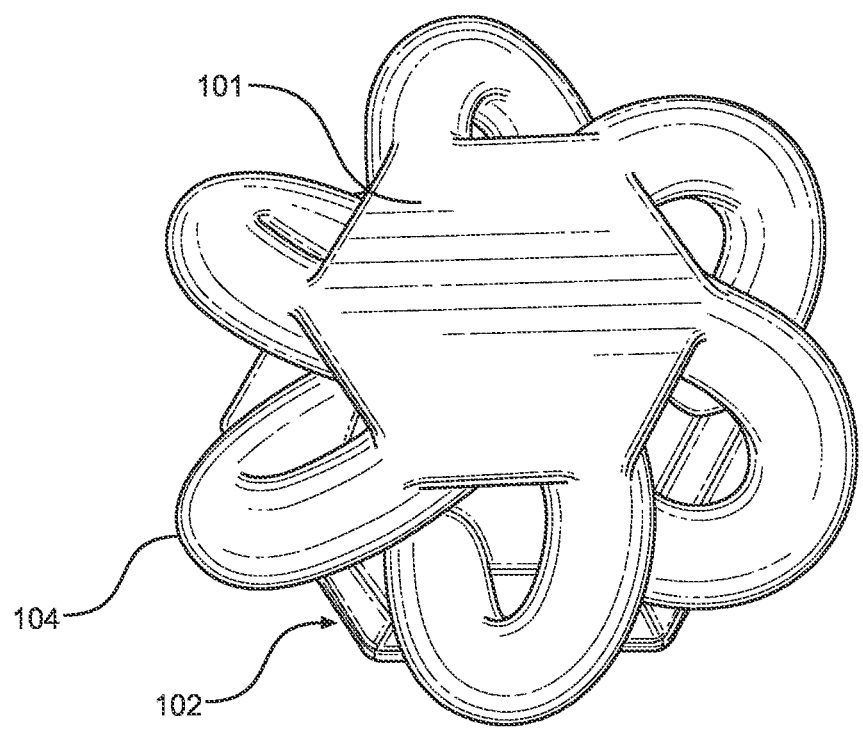
FIG. 3 shows a perspective view of one embodiment of a single interlockable part of the material made from a plurality of interlocking parts.
Figure 4:
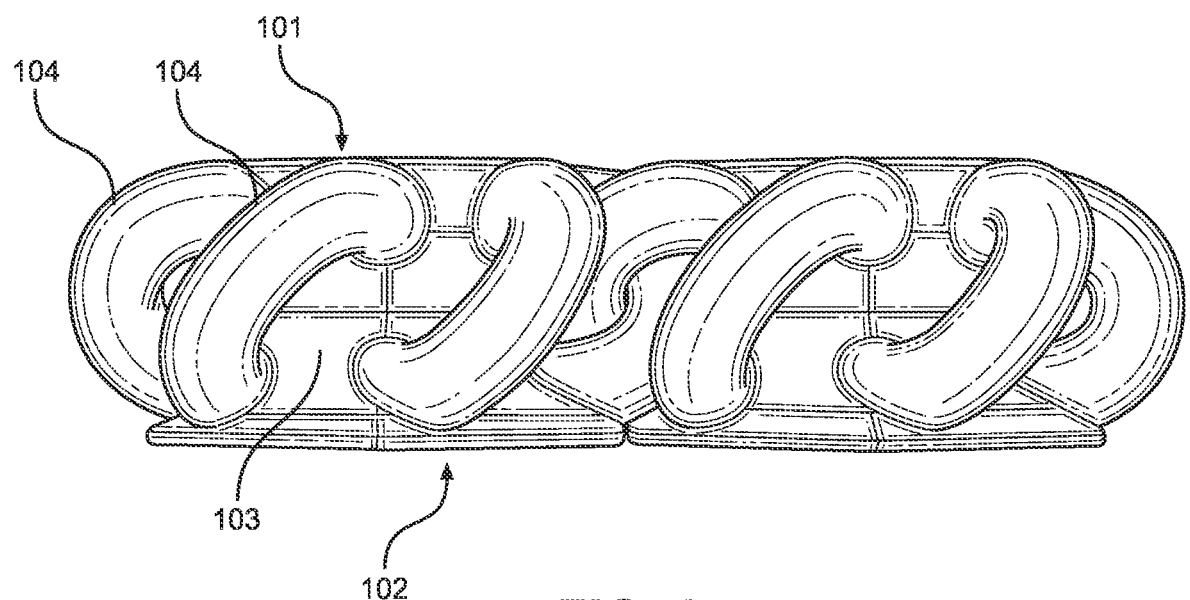
FIG. 4 shows a side view of one embodiment of the material made from a plurality of interlocking parts.

Referring now to FIG. 3 and FIG. 4, there is shown a perspective view and a side view of one embodiment of interlockable parts of the material made from a plurality of interlocking parts. Here in the shown embodiment the interlockable part includes a first side 101, a second side, 102, and a center beam 103. Each of these parts is similar to the description of the same parts in the description of FIG. 1 and FIG. 2. Here the loops 104 are also a part of the interlockable parts.

Figure 5:
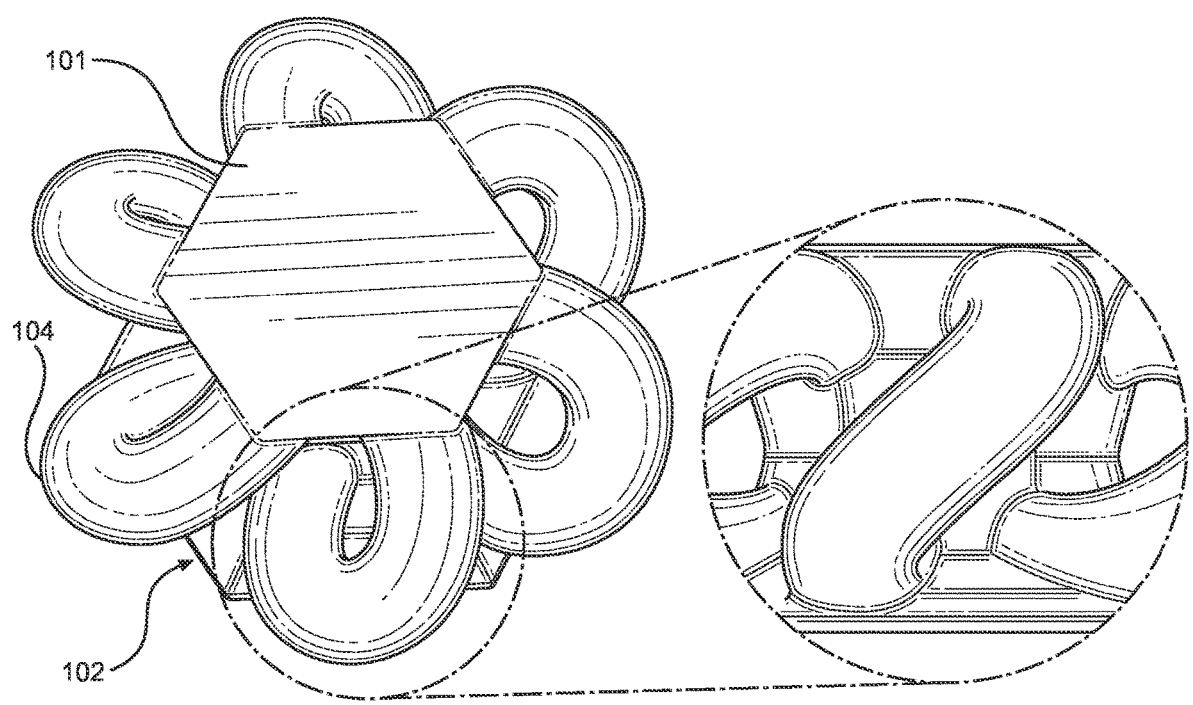
FIG. 5 shows a perspective view of one embodiment of a single interlockable part of the material made from a plurality of interlocking parts.
Figure 6:
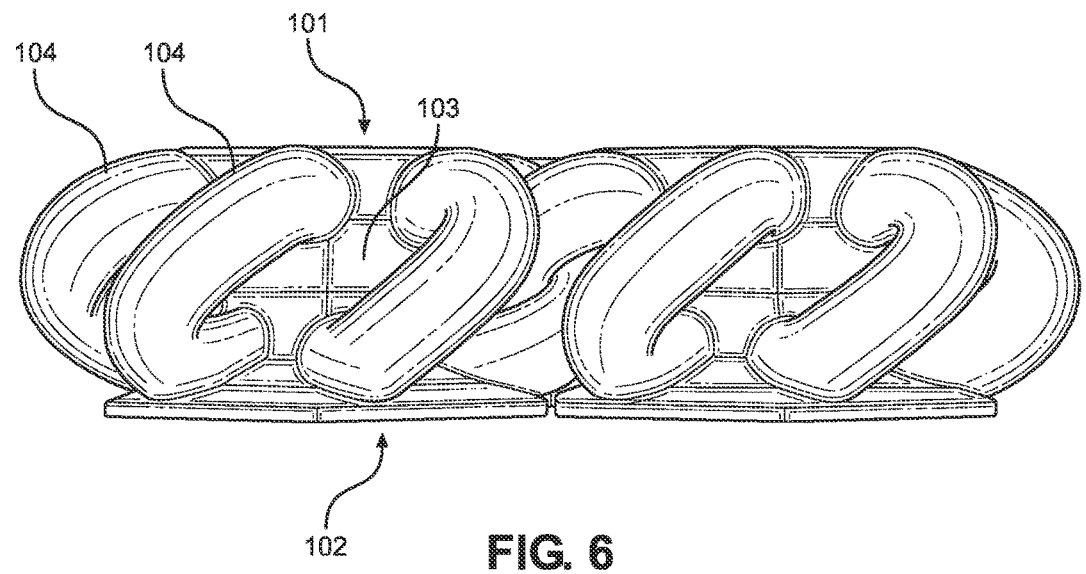
FIG. 6 shows a side view of one embodiment of the material made from a plurality of interlocking parts.

Referring now to FIG. 5 and FIG. 6, there is shown a perspective view and a side view of one embodiment of interlockable parts of the material made from a plurality of interlocking parts. Here again in the shown embodiment the interlockable part includes a first side 101, a second side, 102, and a center beam 103. Each of these parts is similar to the description of the same parts in the description of FIG. 1 and FIG. 2. Here the loops 104 are also a part of the interlockable parts.

In the shown embodiment the loops 104 are curved or S shaped. Loops 104 of this shape will allow for a greater flexibility of the material when secured together. This means that an 2 shaped loop 104 can have a thicker cross section while maintaining the same flexibility as the C shaped loop. By adding a thicker cross section the material maintains all of its original properties and has an increased strength and durability.

In the shown embodiment the loops 104 are connected in part to the main beam 103. In different embodiments the loops 104 also may be connected, at least in part, to the first side 101. In different embodiments the loops 104 also may be connected, at least in part, to the second side 102. In some embodiments the loops 104 may be connected, at least in part, to a combination of the main beam 103, the first side 101, and the second side 103. These connections will allow for added strength due to the added surface area of the connections.

For each of the parts as described in the parts of FIG. 1—FIG. 6 there are several features which may be applied to any of the forgoing parts. In one embodiment the parts may be made from varying types of plastic. This will create a strong material which will adequately perform the functions as described. In another embodiment strength can be added to the material by use of nylon materials.

Further, in some embodiments the second side of each of the parts may have a varying thickness. The difference in thickness can add size to the material, which in some embodiments may be undesirable. However, in other embodiments the added thickness will add strength to the material. In one embodiment the added thickness will create a material with added rigidity. In other embodiments the added thickness will allow the material to lock out and become rigid sooner.

Figure 7:
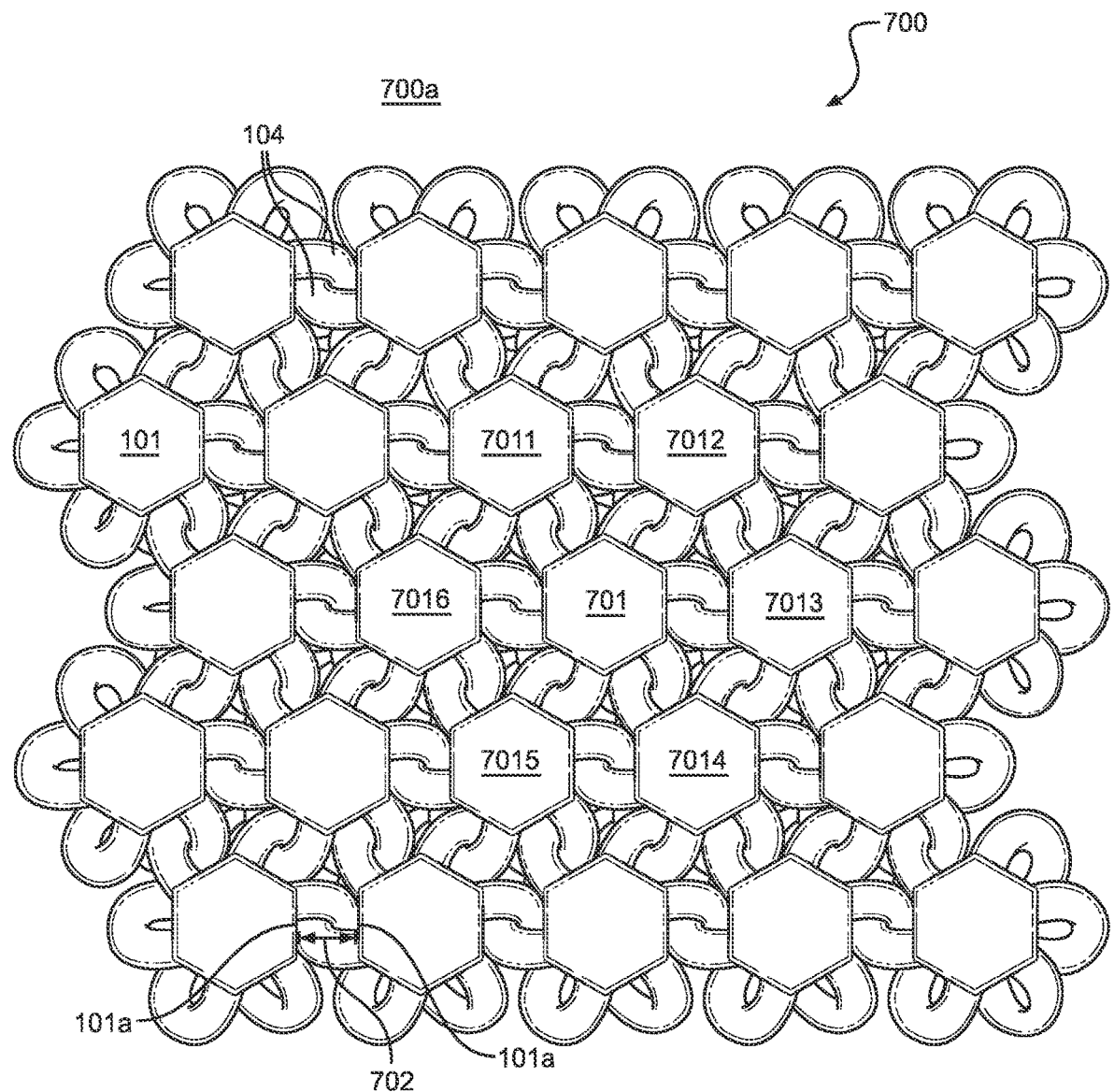
FIG. 7 shows a top-down view of an embodiment of a first side of the material created from interlocking parts.

Referring now to FIG. 7, there is shown a top-down view of an embodiment of a first side of the material created from interlocking parts. In the shown embodiment the interlocking parts have been connected together via the loops 104. Here the first side 104 has a hexagonal shape. When one picks a middle interlocking part 701 there are six other interlocking parts 7011, 7012, 7013, 7014, 7015, 7016 there around. When this pattern is repeated a sheet of material 700 is created.

From the view of the first side 700a of the sheet of material 700 there can be seen gaps 702 between the edges 101a of the first side 101 of each interlockable part. The gaps 702 between the edges 101a allow for the sheet of material 700 to fold in on itself. This means that when pressure is applied to the shown side of the material it will bend and fold.

Figure 8:
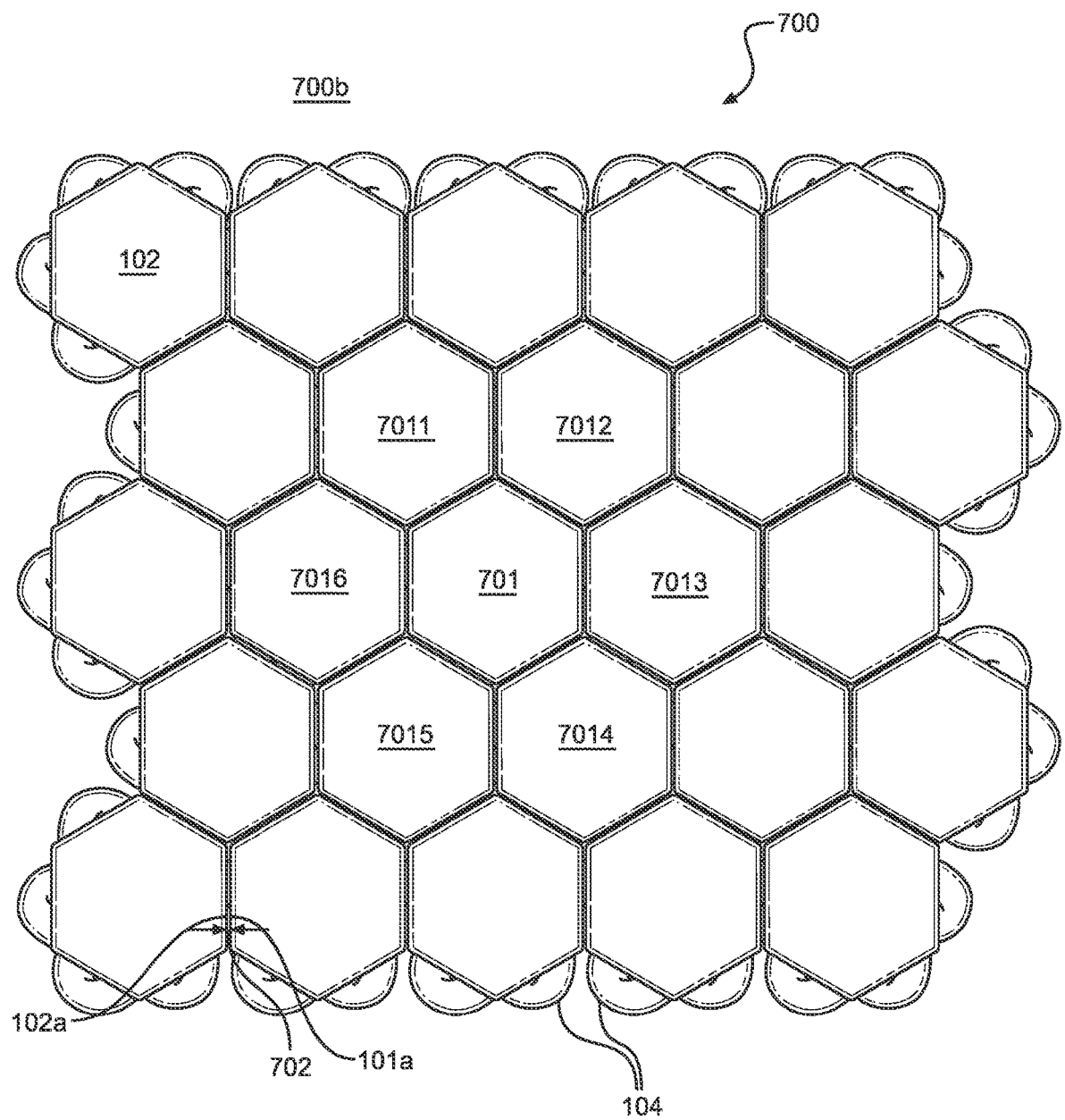
FIG. 8 shows a bottom-up view of an embodiment of a second side of the material created from interlocking parts.

Referring now to FIG. 8, there is shown a bottom-up view of an embodiment of a second side of the material created from interlocking parts. Here the second side 700b of the sheet of material 700 is made up of a plurality of second sides 102 of interlockable parts. The loops 104 are secured and holding the interlockable parts together. Here too when one picks a middle interlocking part 701 there are six other interlocking parts 7011, 7012, 7013, 7014, 7015, 7016 there around. When this pattern is repeated a sheet of material 700 is created.

The difference between the first side of the material 700 and the second side of the material 700b is the gaps 702 between the edges 102a of the second side 102 of the interlockable parts. Here the gaps 702 are significantly smaller or in some instances non-existent. The smaller the gap 702 the more rigid the sheet of material. Here as pressure is applied to the second side 700b of the sheet of material 700 the material will flex slightly. This flex will pull on the loops 104 and force the edges 102a of the second side of the interlockable parts together. As the edges 102a are forced together the material becomes more rigid. This means that the material 700 will only move so far before becoming one solid sheet.

Figure 9A:
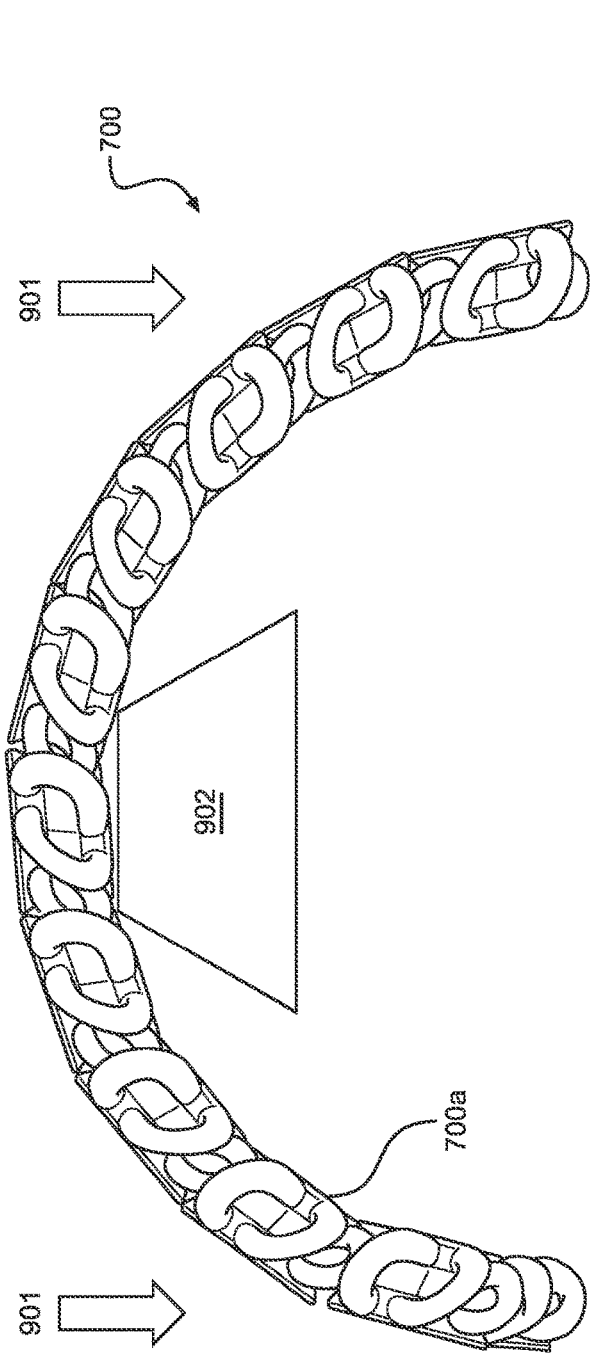
FIG. 9A shows a side view of an embodiment of the material created from interlocking parts resting on the first side of the material.
Figure 9B:
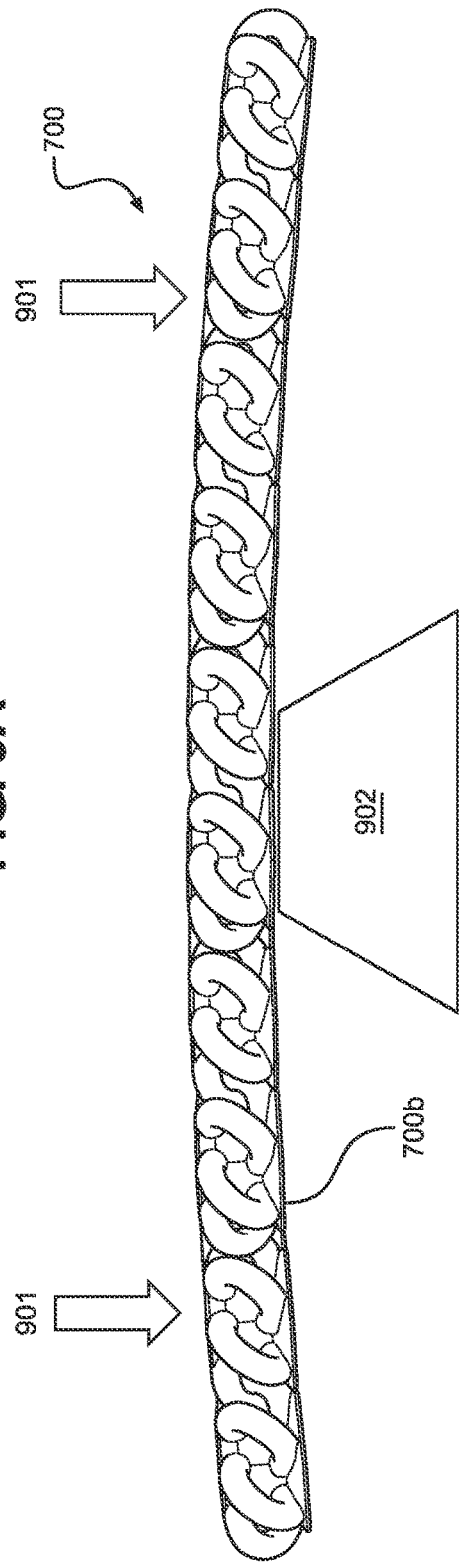
FIG. 9B shows a side view of an embodiment of the material created from interlocking parts resting on the second side of the material.

Referring now to FIG. 9A and FIG. 9B, there are shown two side views of an embodiment of the material created from interlocking parts resting on the first side of the material and resting on the second side of the material. In the FIGs a force 901 is applied to the material 700 via gravity. A sheet of material 700 is placed on a point 902 allowing the pressure to be applied to the material 700.

In one embodiment the material is placed on top of a point 902 such that the first side 700a of the material 700 is pointed downward. In this embodiment the material 700 bends down as a result of the force 901.

In another embodiment the material is placed on top of a point 902 such that the second side 700b of the material 700 is pointed downward. In this embodiment the material 700 holds its flat shape in spite of the gravitational pull 901.

Figure 10:
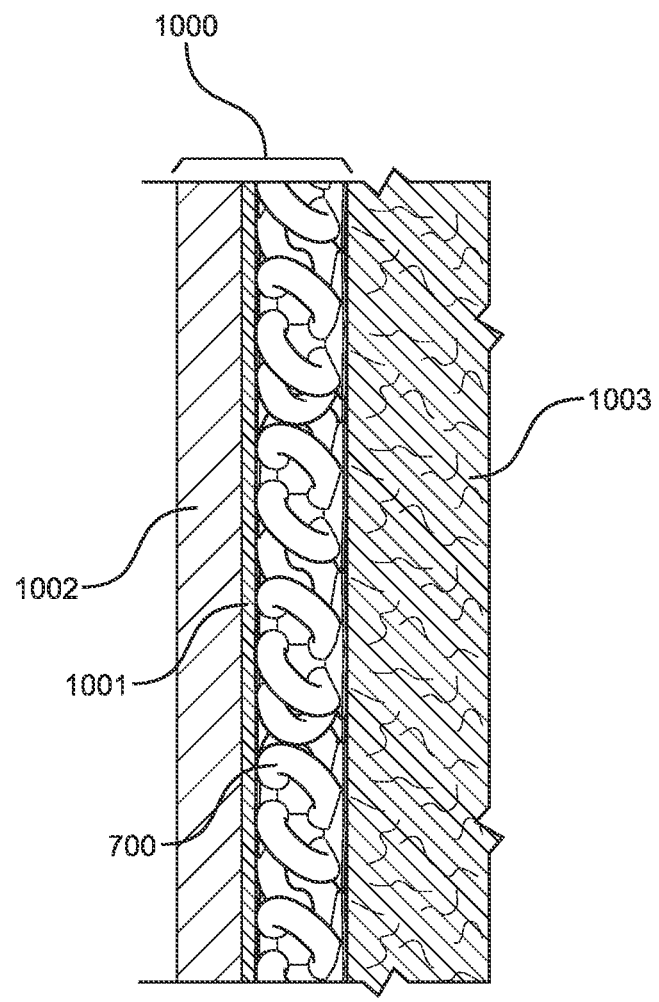
FIG. 10 shows a cross sectional view of an embodiment of combination of armor including the material created from interlocking parts.

Referring now to FIG. 10, there is shown a cross sectional view of an embodiment of combination of armor including the material created from interlocking parts. In one embodiment the material 700 is used as an integral part of body armor 1000. In the shown embodiment for example, a body armor 1000 may have a first material 1001 which is used to hold the armor together. In between this first material 1001 at least one layer of Kevlar 1002 is used. In another embodiment other materials capable of stopping projectiles may be used.

Further, at least one sheet of material 700 is added to the body armor 1000. When put in place the material 700 is positioned such that the first side of the material 700 faces a body 1003. This means that should a projectile strike the body armor 1000 the material 700 will at most flex slightly. Another benefit of the material 700 is that when it flexes and the interlockable parts tightened and are forced together they dissipate energy and spread the energy across the material 700. Due to this feature, the material 700 will better stop a projectile while causing less trauma to the person. Further, the material 700 will enhance the stopping power of the Kevlar. This means that a piece of body armor 1000 may be able to stop larger caliber projectiles without needing additional Kevlar.

Figure 11:
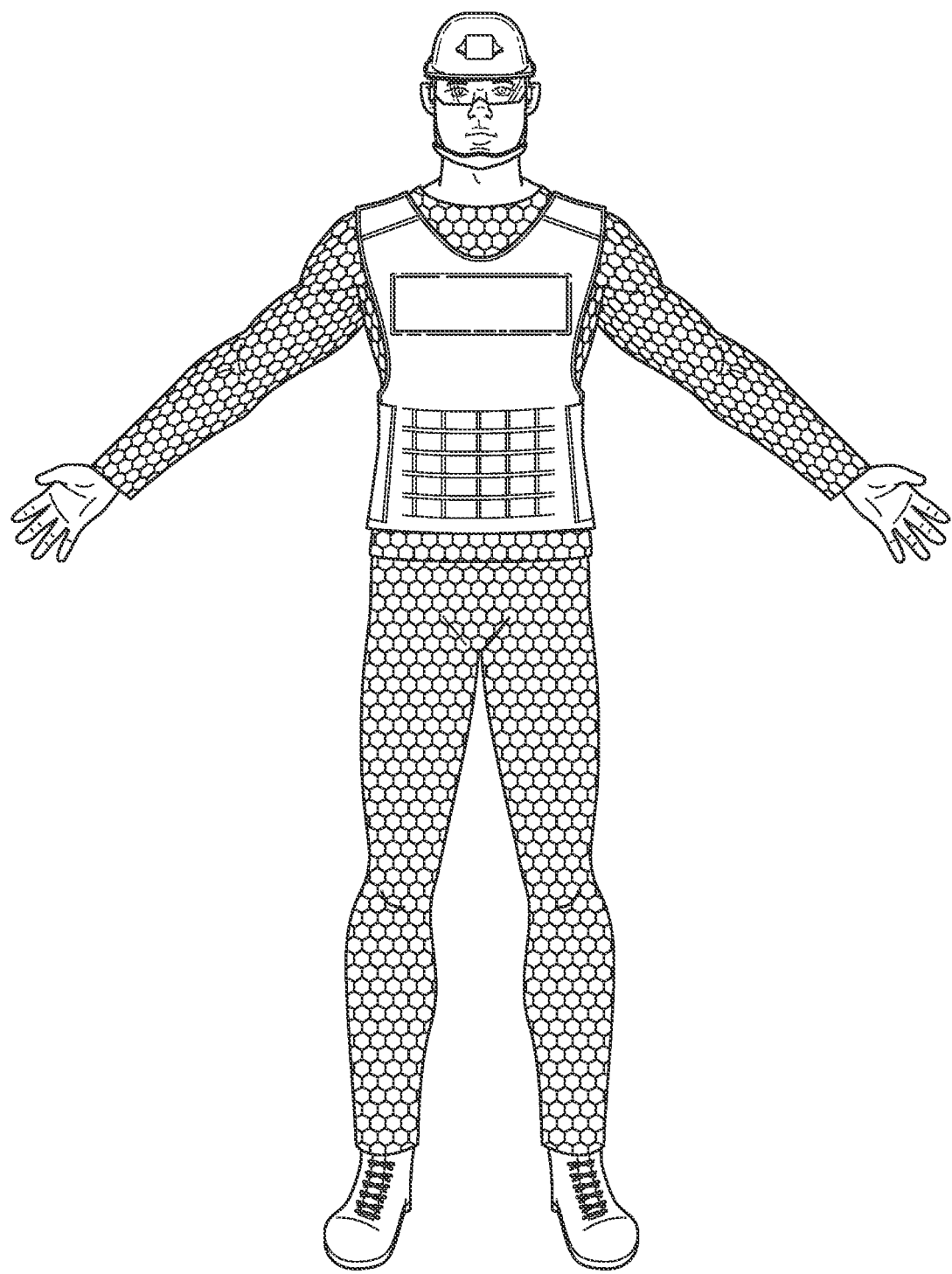
FIG. 11 shows a perspective view of an embodiment of a set of armor being worn by an individual.

Referring now to FIG. 11, there is shown a perspective view of an embodiment of a set of armor being worn by an individual. In one embodiment the material is used to create a slash and stab resistance armor 1101. This armor 1101 may be used in connection with body armor 1001. In the shown embodiment the wearer 1102 has a shirt 1101*a* made entirely from the material. This will protect one's entire upper body while still allowing the wearer mobility due to the materials ability to flex in one direction. The wearer 1102 is also wearing a set of pants 1101*b* to complete the armor 1101. This will protect a wearer's 1102 legs from damage similar to the protection offered by the shirt 1101*a*.

When the material is impacted it will flatten out. The loops of the material will tighten pulling the interlockable parts together. This will prevent damage to a person because the parts will prevent penetration of sharp objects. In a similar fashion the locking out of the material will create an impact reduction effect. As the material becomes rigid it spreads out the force of the impact along the material creating a larger impact zone for a force to be spread across.

Another benefit to the present material comes from the manner in which the links are locked in place to become rigid. As described above, for the links to become rigid they are forced together forming one solid wall. This feature provides an added benefit to the stab resistance of the material. As a knife or other object is pressed into the material and lodged between the links the links are pushed together pinching the object. This means that the more the object is forced into the material the more the material pinches the object, reducing the penetration.

While this disclosure has described the material in terms of a body armor for protection from impacts of a violent nature such as shootings and stabbings, the material also has many other potential uses. For example, in one embodiment the material may be used to create a sports pad. The impact reduction features make the material perfect for padding such as football pads. Further, the material may be used to create an impact reduction suit for sports such as motorcar racing.

Another use for the material may include use in electronics. Foldable and flexible screens are now beginning to enter the market. These screens, while functional, leave much to be desired. Further, older solid screens are prone to cracking and shattering.

Currently, phone screens are being designed such that they are larger and rigid. This rigidity prevents the screens from flexing and protecting them. Even though new screen technologies, such as OLED screens, can fully flex and bend, they are still brittle. Due to the brittle nature of these screens, they are locked into a rigid housing to protect them. The present material would allow these screens to have a rigid backing that would protect the rear of the screen, while still letting them flex forward. This would allow for a screen that could rotate and bend in a positive direction, but lock out into a flat surface for viewing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A material made from a plurality of interlocking parts, the material comprising:
A plurality of interlocking parts, each part comprising:
a first side connected to a main beam at one end;
a second side connected to the opposing end of the main beam;
wherein the first side, the second side, and the main beam of each interlocking part of the plurality of interlocking parts are all hexagonal;
a plurality of loops connected at least to the main beam;
each interlocking part of the plurality of interlocking parts is secured to at least one other interlocking part of the plurality of interlocking parts via the loops.

2. The material of claim 1 wherein each interlocking part of the plurality of interlocking parts is made up such that the first side has a smaller surface area than the second side.

3. The material of claim 1 wherein the loops of each interlocking part of the plurality of interlocking parts are connected at least in part to the underside surface of the first side and the underside surface of the second side.

4. The material of claim 1 wherein the loops of each interlocking part of the plurality of interlocking parts are positioned at an angle compared to the main beam.

5. The material of claim 4, wherein the angle of the loops of each interlocking part of the plurality of interlocking parts is between 0 degrees and 45 degrees.

6. The material of claim 1, wherein the material bends in a first direction and remains rigid in a second opposite direction.

7. The material of claim 6, wherein the material allows for a slight flex when a force is applied to force the material in the second direction.

8. The material of claim 2, wherein a first gap exists between each apposing edge of the first side of each interlocking part; and wherein a second gap exists between each apposing edge of the second side of each interlocking part.

9. The material of claim 8, wherein the size of the second gap is directly related to the rigidity of the material;
the relationship is such that the smaller the gap the more rigid the material and the larger the gap the greater the flex of the material before becoming rigid.

\* \* \* \* \*